(12) United States Patent
Vermilyea et al.

(10) Patent No.: US 8,123,886 B2
(45) Date of Patent: Feb. 28, 2012

(54) METHOD OF MANUFACTURE OF COMPOSITE LAMINATES, AN ASSEMBLY THEREFOR, AND RELATED ARTICLES

(75) Inventors: Mark Ernest Vermilyea, Niskayuna, NY (US); Bowden Kirkpatrick, Bennington, VT (US); Philip Alexander Shoemaker, Scotia, NY (US); Terrence Paul Vernes, Bel Air, MD (US)

(73) Assignee: General Electric Company, Niskayuna, NY (US)

( * ) Notice: Subject to any disclaimer, the term of this patent is extended or adjusted under 35 U.S.C. 154(b) by 833 days.

(21) Appl. No.: 12/212,029

(22) Filed: Sep. 17, 2008

(65) Prior Publication Data

US 2010/0065367 A1   Mar. 18, 2010

(51) Int. Cl.
*B65H 81/00* (2006.01)

(52) U.S. Cl. ........ 156/166; 156/169; 156/173; 156/175; 156/242; 156/245; 156/252; 156/256

(58) Field of Classification Search .................. 156/166, 156/169, 173, 175, 252, 242, 245, 256
See application file for complete search history.

(56) References Cited

U.S. PATENT DOCUMENTS

| | | | | |
|---|---|---|---|---|
| 3,021,241 A | * | 2/1962 | Schneiderman et al. | 156/173 |
| 3,704,194 A | * | 11/1972 | Harrier | 156/245 |
| 3,765,980 A | * | 10/1973 | Hurlbut et al. | 156/175 |
| 3,787,546 A | * | 1/1974 | Pratt et al. | 156/252 |
| 4,132,519 A | * | 1/1979 | Reed | 425/174.2 |
| 4,486,372 A | * | 12/1984 | Millard et al. | 156/242 |
| 4,600,619 A | * | 7/1986 | Chee et al. | 156/173 |
| 4,944,362 A | | 7/1990 | Motsinger et al. | |
| 5,268,055 A | * | 12/1993 | Bales et al. | 156/252 |
| 6,203,656 B1 | | 3/2001 | Syed | |
| 6,206,136 B1 | | 3/2001 | Swindlehurst et al. | |
| 6,820,337 B2 | | 11/2004 | Buge et al. | |
| 6,923,931 B2 | | 8/2005 | Dublineau et al. | |
| 7,257,894 B2 | | 8/2007 | Buge et al. | |
| 7,261,026 B2 | | 8/2007 | Welch et al. | |
| 7,347,961 B2 | | 3/2008 | Obrachta et al. | |
| 2004/0187661 A1 | | 9/2004 | Obrachta | |
| 2005/0060982 A1 | | 3/2005 | Mani et al. | |

FOREIGN PATENT DOCUMENTS

JP       05-269868 A  * 10/1993
WO     WO-99/22932 A1 *  5/1999

\* cited by examiner

*Primary Examiner* — Jeff Aftergut

(74) *Attorney, Agent, or Firm* — Penny A. Clarke

(57) ABSTRACT

A method is described for making a composite laminate formed by curing a stacked structure comprising at least two layers of strips of fibrous material impregnated with resin, wherein the strips in adjacent layers have different directional orientations. An apparatus is provided for simultaneously separating a band of fibrous material impregnated with resin into strips and depositing the strips between adjacent pin rows of a pinmat to form the stacked structure.

6 Claims, 9 Drawing Sheets

METHOD OF MANUFACTURE OF COMPOSITE LAMINATES, AN ASSEMBLY THEREFOR, AND RELATED ARTICLES

BACKGROUND OF THE INVENTION

The present disclosure is generally related to a method of manufacture of a composite laminate, an apparatus therefor, and related articles.

Porous composite laminates are of interest in the aviation industry for their utility in noise reduction applications. The composite laminates comprise multiple layers of fiber reinforced resin that are cured to form a self-supporting structure. The laminates contain many through-holes for damping noise vibrations.

Typically, the through-holes are created by drilling the composite laminate after assembling and curing the layers. This method is costly and time-consuming because the holes can number up to a million. Other methods involve puncturing; for example, by forcing a pinmat into a partially cured stack of fiber reinforced resin sheets, or forcing each sheet onto a pinmat during assembly of the stacked structure. This method has the drawback of potentially fracturing the reinforcing fibers as the pins puncture the sheet, reducing mechanical strength of the cured structure. Another method involves lasing holes through a cured structure. This requires high energy lasers.

Less costly and more efficient methods of producing composite laminates having a plurality of through-holes are desirable in overcoming these drawbacks.

BRIEF DESCRIPTION OF THE INVENTION

In one embodiment a method comprises introducing a band of fiber material impregnated with a resin to an apparatus comprising a band separating means and a pinmat, wherein the pinmat comprises a pin pattern having at least two directionally distinct sets of parallel rows of pins projecting from a surface, each one of the sets having a defined gap between each pair of adjacent rows; selecting one of the directionally distinct sets of parallel pin rows; separating the band to form a plurality of strips having a width less than or equal to the defined gap of a selected one of the sets; disposing the strips between the selected one of the sets of the parallel pin rows to form a layer of strips; repeating at least one time the steps of selecting one of the directionally distinct sets of parallel pin rows, separating the band, and disposing the strips to form a stacked structure comprising at least two layers of the strips, wherein the strips in adjacent layers have different directional orientations; and compressing and curing the stacked structure to effect adhesion of the at least two layers so as to form a composite laminate sheet comprising through-holes corresponding to the pin pattern.

An apparatus is configured to separate a band of fiber material impregnated with resin into a plurality of strips and dispose the strips between parallel pin rows of a pinmat to form a layer of strips, the apparatus comprising:

a pinmat-following roller comprising a first roller mounted on a first central axle on which the first roller can rotate and also slide transversely, a first circular rib surrounding the first roller having a size and shape capable of fitting between adjacent pin rows of a pinmat, and a circular groove in the first roller for coupling with the band-separating roller; and a band-separating roller comprising a second roller mounted on a second central axle on which the second roller can rotate and also slide transversely, a plurality of radially projecting disks from the second roller for separating the band of fiber impregnated with a resin, and a second circular rib surrounding the second roller capable of coupling with the circular groove of the pinmat-following roller.

A composite laminate comprises a plurality of through-holes wherein the through-holes form a pattern corresponding to an ordered array of a regular polygon selected from the group consisting of square, parallelogram, hexagon, or octagon, wherein the through-holes are positioned at intersecting points of the polygon sides; and wherein the composite laminate is derived from a compressed and cured composite structure comprising at least two layers of strips of fibrous material impregnated with a resin, wherein each layer comprises strips arranged in parallel and the strips in adjacent layers have different directional orientation.

In another embodiment, an acoustic liner for a jet engine comprises the composite laminate described herein.

Other features and advantages of the method will be or become apparent to one with skill in the art upon examination of the following drawings and detailed description.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

The disclosure may be understood more readily by reference to the following detailed description.

DETAILED DESCRIPTION

A method is disclosed for making a composite laminate comprising a plurality of through-holes, and an apparatus therefor. As implied, the through-holes extend completely through the thickness of the composite laminate, and are not formed by puncturing, drilling, molding, or lasing. The through-holes number in the tens of thousands per square meter. The composite laminate is suitable for noise reduction applications, particularly for acoustic liners for jet engines. The method and apparatus described herein are anticipated to lower production costs, increase output, and improve overall manufacturing efficiency of acoustic liners. The apparatus permits construction of composite laminates having a variety of shapes and contours.

Figure 1:
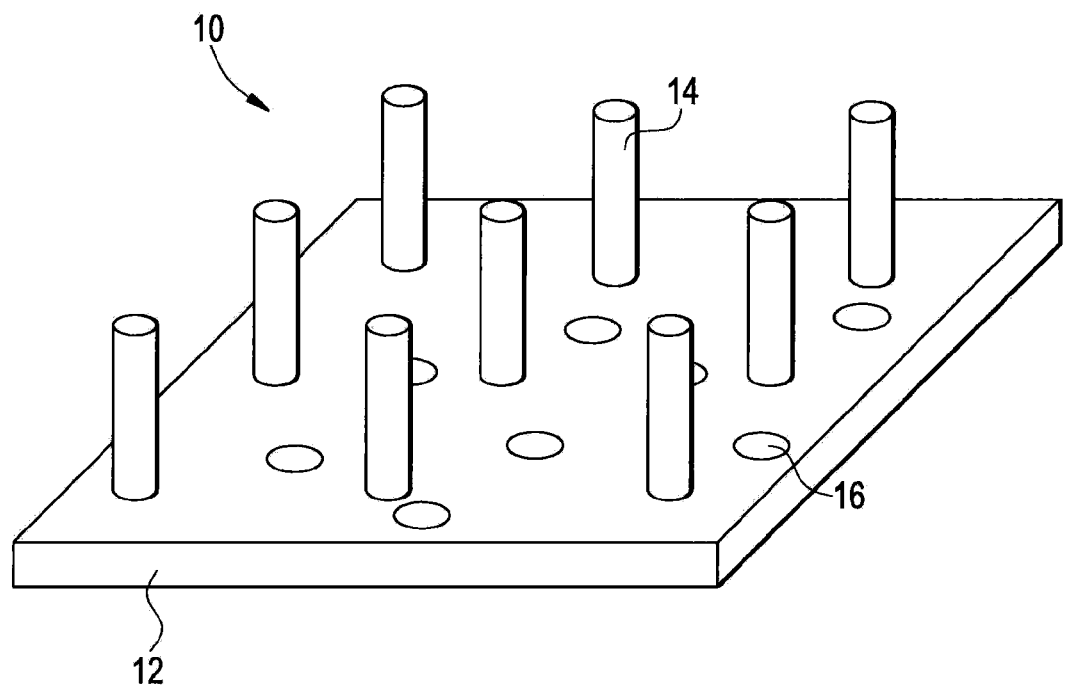
FIG. 1 is a side view schematic of a pinmat.

The first step of the method comprises introducing a band of fiber material impregnated with a resin to an apparatus comprising a band separating means and a pinmat. A pinmat is illustrated generally as 10 in FIG. 1, comprising a surface 12 to which are attached outwardly projecting pins 14. Pinmat 10 can optionally comprise apertures 16 extending through surface 12 for applying a vacuum to the face opposite the pins. The pin density is 1,000 to 1,000,000 pins per square meter of pinmat surface, more particularly 10,000 to 100,000, and even more particularly 30,000 to 70,000 pins per square meter of pinmat surface.

The pin shank can have a diameter of 1 to 5 mm, more particularly 2 to 4 mm and even more particularly 2 to 3 mm. The pin length can be at least 1 mm, more particularly 2 to 20 mm, and most particularly 5 to 10 mm. The tip of the pins can have any shape, particularly rounded, conical, pyramidal, trapezoidal (as a truncated cone), or flat providing the tip does not interfere with the placement of a film strip between the pin rows.

The pinmat can comprise a rigid or flexible base and have the shape of a flat plane, a straight cylinder or a more complex 3-dimensional shape comprising at least one convex and/or concave surface feature.

The pin row gap refers to the orthogonal distance between two adjacent rows of pins (equal to the center-center pin spacing minus the pin diameter). The pin row spacing also equals the width of the widest strip of film that can be laid flat between two adjacent parallel pin rows. The row spacing is at least 1 mm, more particularly 1 to 8 mm, and most particularly 2 to 5 mm.

Figure 2:
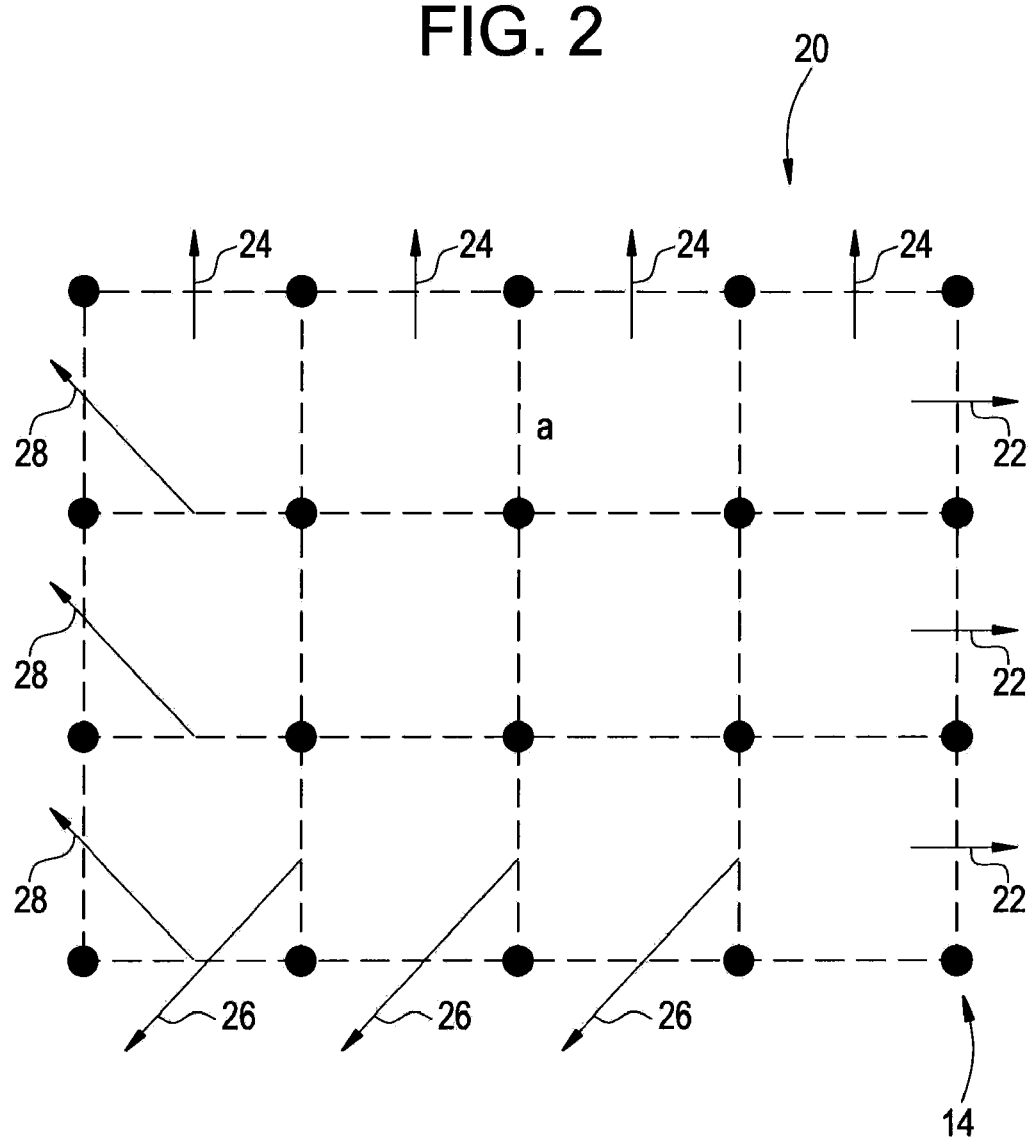
FIG. 2 is an overhead view of a pin pattern formed from an array of squares.
Figure 3:
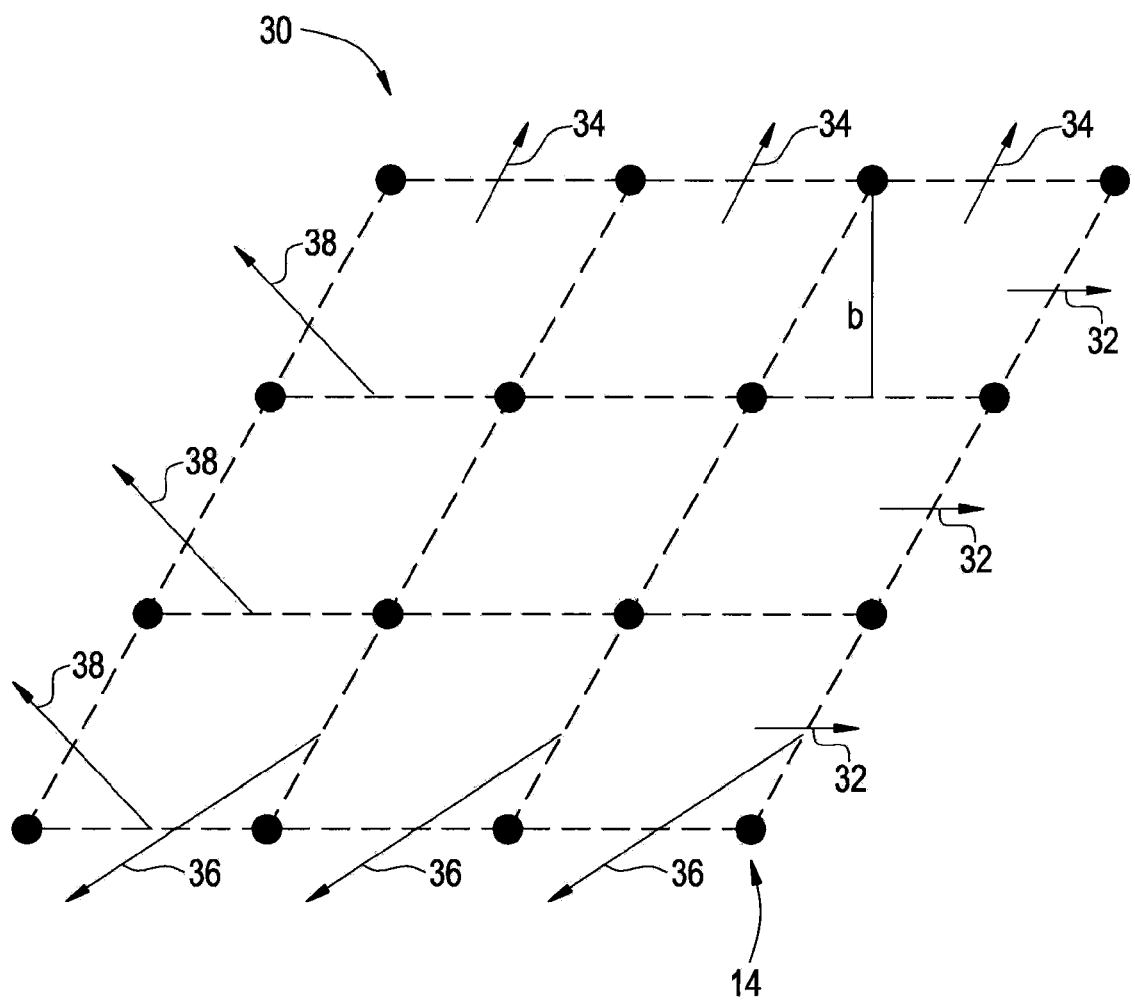
FIG. 3 is an overhead view of a pin pattern formed from an array of parallelograms.
Figure 4:
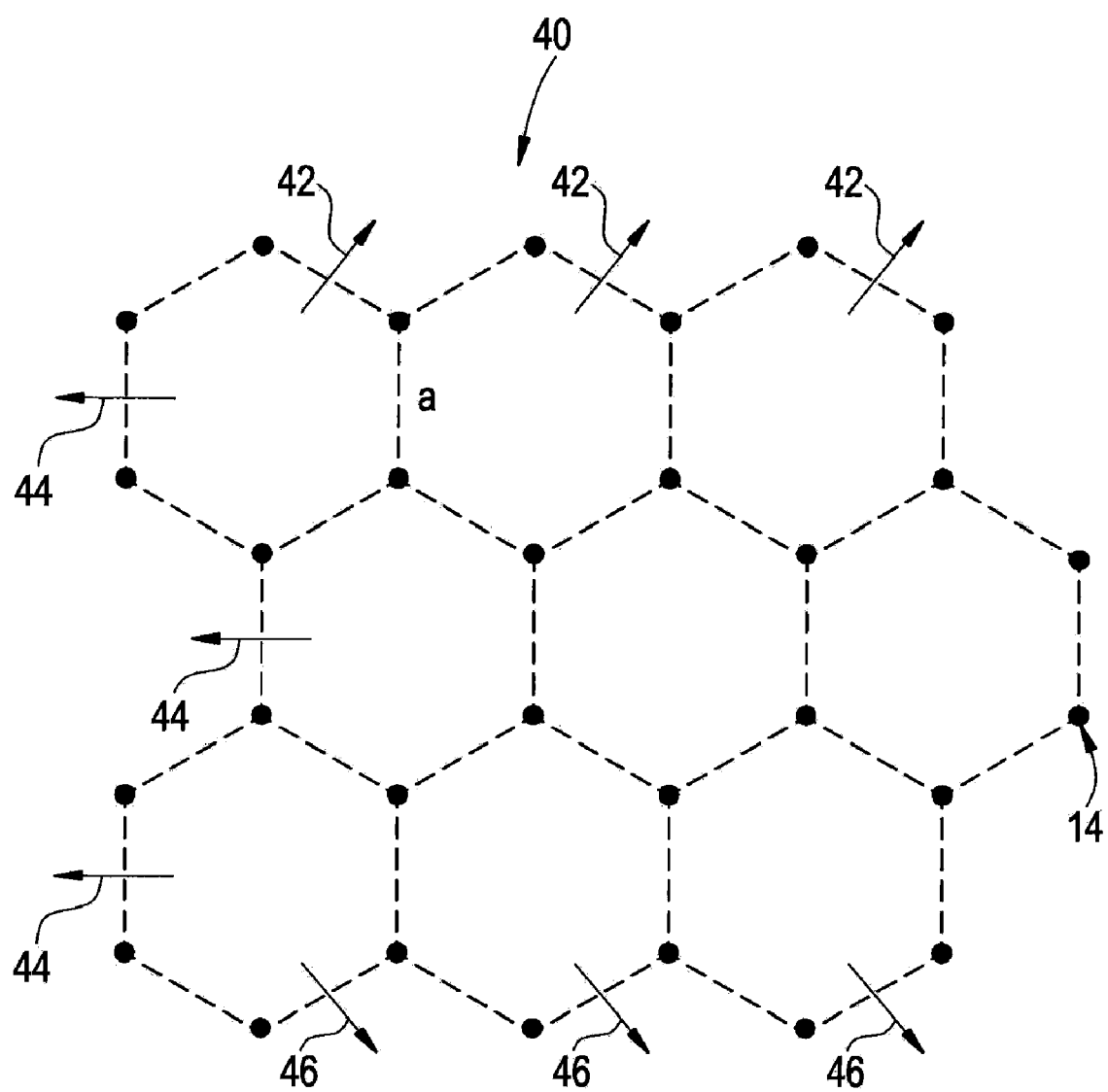
FIG. 4 is an overhead view of a pin pattern formed from an array of hexagons.
Figure 5:
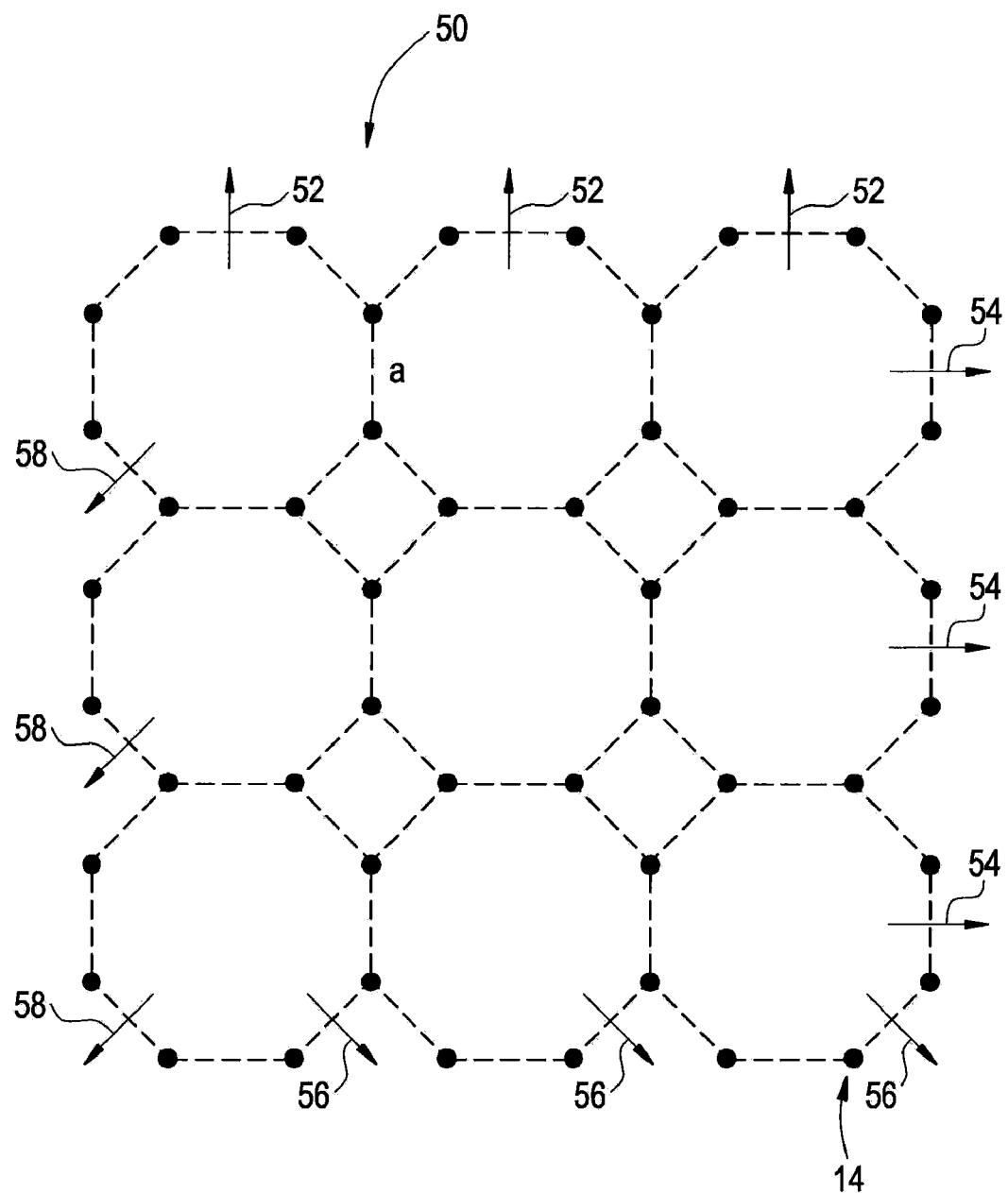
FIG. 5 is an overhead view of a pin pattern formed from an array of octagons.

The pins 14 form a pattern comprising at least two directionally distinct sets of parallel rows of pins having the same row spacing. A pin pattern herein also corresponds to an array formed by a repeating regular polygon figure in two dimensions, in which each pin occupies an intersection point of two sides of the polygon. FIGS. 2 to 5 illustrate overhead views of exemplary pin patterns, where the pins 14 are represented by the filled circles at each intersection point. The dashed lines outline the array formed with a polygon figure, and the intersecting sides that form a template for the pin positions. Pin pattern 20 in FIG. 2 is formed from an array of squares having sides "a". Pin pattern 30 in FIG. 3 is formed from an array of parallelograms having sides "a". Pin pattern 40 in FIG. 4 is formed from an array of regular hexagons having sides "a". Pin pattern 50 in FIG. 5 is formed from an array of regular octagons having sides "a". The double arrows indicate the directional orientation of the parallel rows in each set. For example, square pin pattern 20 has two sets of directionally distinct parallel rows of pins having a row spacing of a represented by the arrows 22 and 24. The arrows 22 and 24 are positioned between adjacent parallel rows of pins for visual clarity. Two more sets indicated by arrows 26 and 28 have equal row spacing less than "a". Parallelogram pin pattern 30 in FIG. 3 also has two sets of directionally distinct parallel rows of pins 32 and 34 having a row spacing of "b", and two sets designated as 36 and 38 having a rows spacing not equal to "b" and not equal to each other. Hexagon pin pattern 40 has three sets of directionally distinct parallel rows of pins indicated by arrows 42, 44, and 46 having a row spacing of "a", and 4 sets of parallel rows of pins having a row spacing less than "a" (not indicated). Octagon pin pattern 50 has four sets of directionally distinct parallel rows of pins 52, 54, 56, and 58 having a row spacing of "a" and four sets having a spacing less than "a" (not shown). Also contemplated are pin patterns formed from irregular polygon figures wherein the sets have unequal widths, such as pin pattern formed with a rectangle having sides of unequal length, or a "flattened" hexagon having sides of equal length forming unequal angles.

In the next step of the process, one of the sets of parallel pin rows is selected for depositing a layer of strips on the pinmat. Those of skill in the art will recognize that selecting can be performed mechanically, manually or by means of a computer program.

Figure 6:
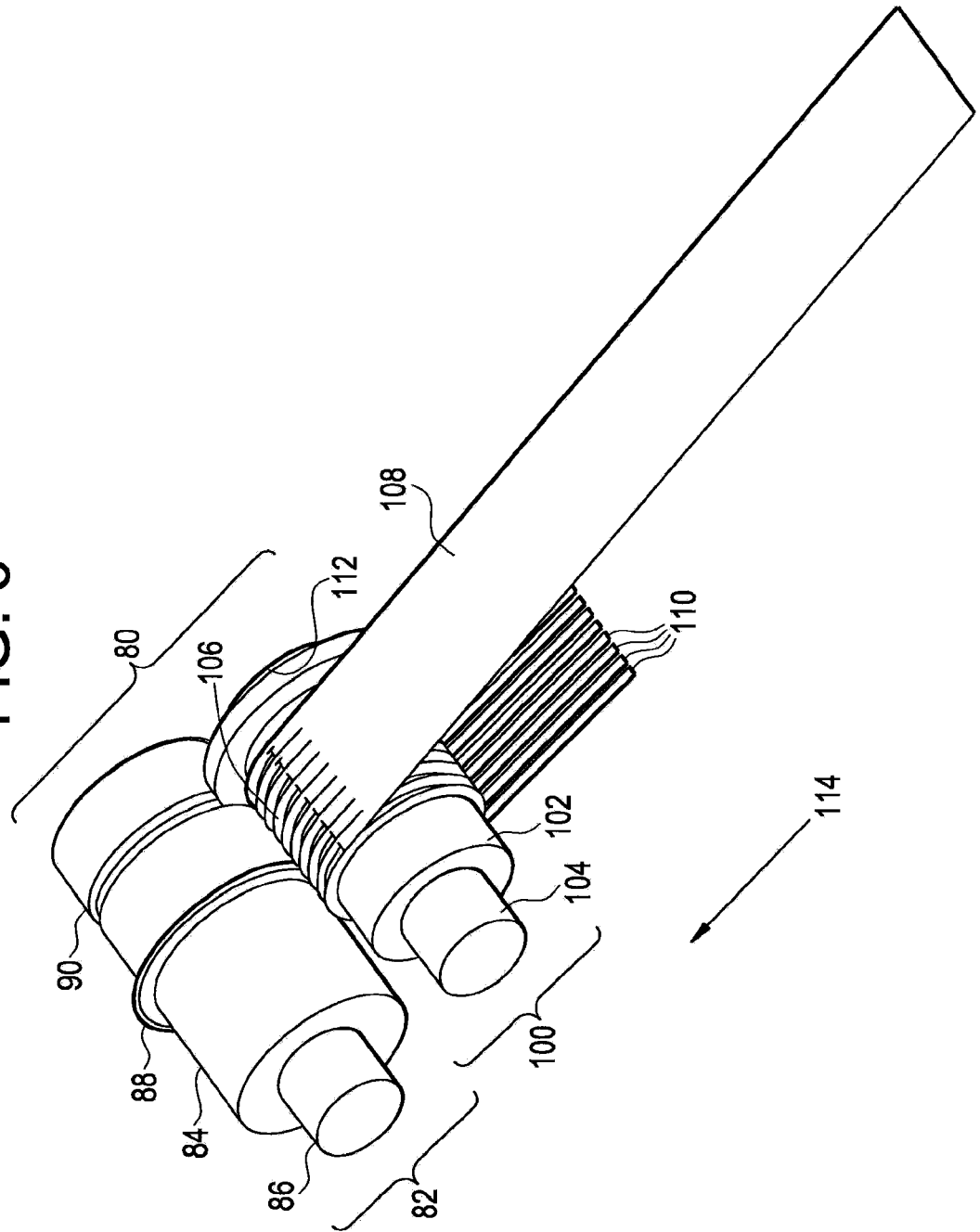
FIG. 6 is a side-view of an assembly comprising a pinmat-following roller and a band-separating roller, for simultaneously separating a band of fibrous material into strips and disposing the strips between the parallel rows of a pinmat.

The next two steps of the process comprise separating a band of the fibrous material impregnated with a resin into a plurality of strips, and disposing the strips between the selected pin rows. Separating and disposing can be performed sequentially or more particularly simultaneously utilizing an apparatus 80 illustrated in FIG. 6. FIG. 6 is an overhead view of apparatus 80. Apparatus 80 comprises a pinmat-following roller 82 and a band separating roller 100. The pinmat-following roller 82 is designed to roll between adjacent pin rows (not shown) of a pinmat. Arrow 114 indicates the forward direction of movement. Pinmat-following roller 82 comprises a first roller 84 mounted on a first central axle 86 on which first roller 84 can rotate or slide transversely. A first circular rib 88 having a size and shape capable of fitting between adjacent pin rows surrounds first roller 84. First roller 84 further comprises a circular groove 90 for coupling with and maintaining alignment of the band-separating roller 100. Band-separating roller 100 comprises a second roller 102 mounted on a second central axle 104 on which the second roller 102 can rotate or slide transversely. Second roller 102 also comprises a plurality of radially projecting disks 106 which have a generally inverted-V shape serving to separate the fibrous band 108 into sub-bands or strips 110 having a width roughly equal to that of the row spacing. The separating action is initiated by either separating the band into multiple bundles prior to threading the machine, or by using a separate fiber tow for each part of the band, and maintained because of tension on the band 108. The strips 110 can have a thickness different from the thickness of the initial band 108. The thickness can be either less or greater than the initial band 108 by virtue of this separating action, depending on whether the width of the flat section between the disks is narrower or wider than the original tow width. Band-separating roller 100 further comprises a second circular rib 112 surrounding the second roller 102 that couples with the circular groove 90 of pinmat-following roller 82. The pin rows maintain alignment of pinmat-following roller 82 while apparatus 80 completes a pass over the pinmat. At the same time, circular groove 90 maintains alignment of band-separating roller 100 to allow precise placement of the strips between the parallel rows of pins.

Figure 7:
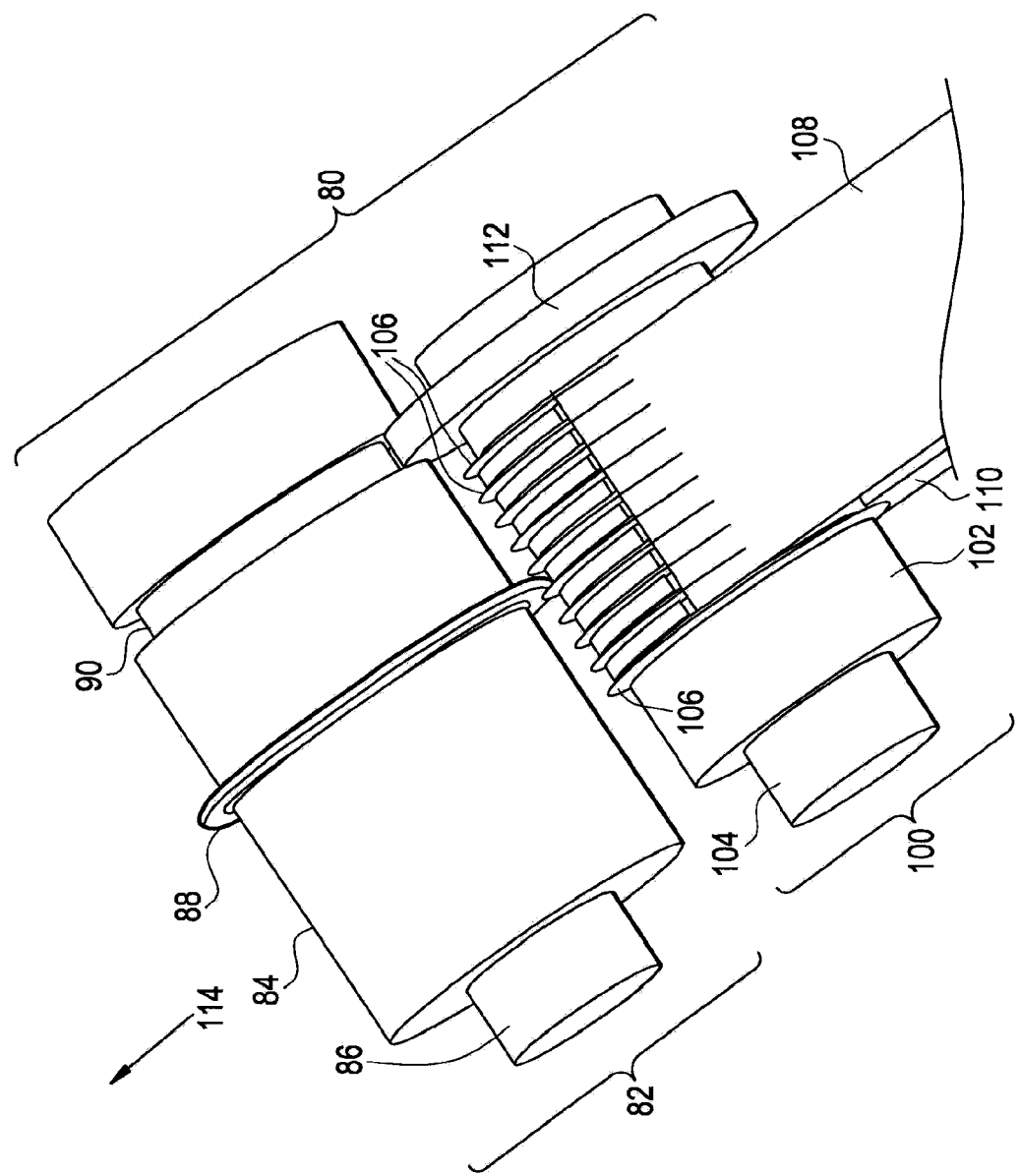
FIG. 7 is an overhead view of the assembly comprising a pinmat-following roller and a band-separating roller.

FIG. 7 depicts a top-side view of apparatus 80 showing ten radially projecting disks 106. No limitation is placed on the number of these disks. Generally the disks can number from 2 to 100, more particularly from 2 to 20. The spacing between the radial disks corresponds to the row spacing in the pinmat. First circular rib 88 of the pinmat-following roller is positioned between two of the radial disks.

Figure 8:
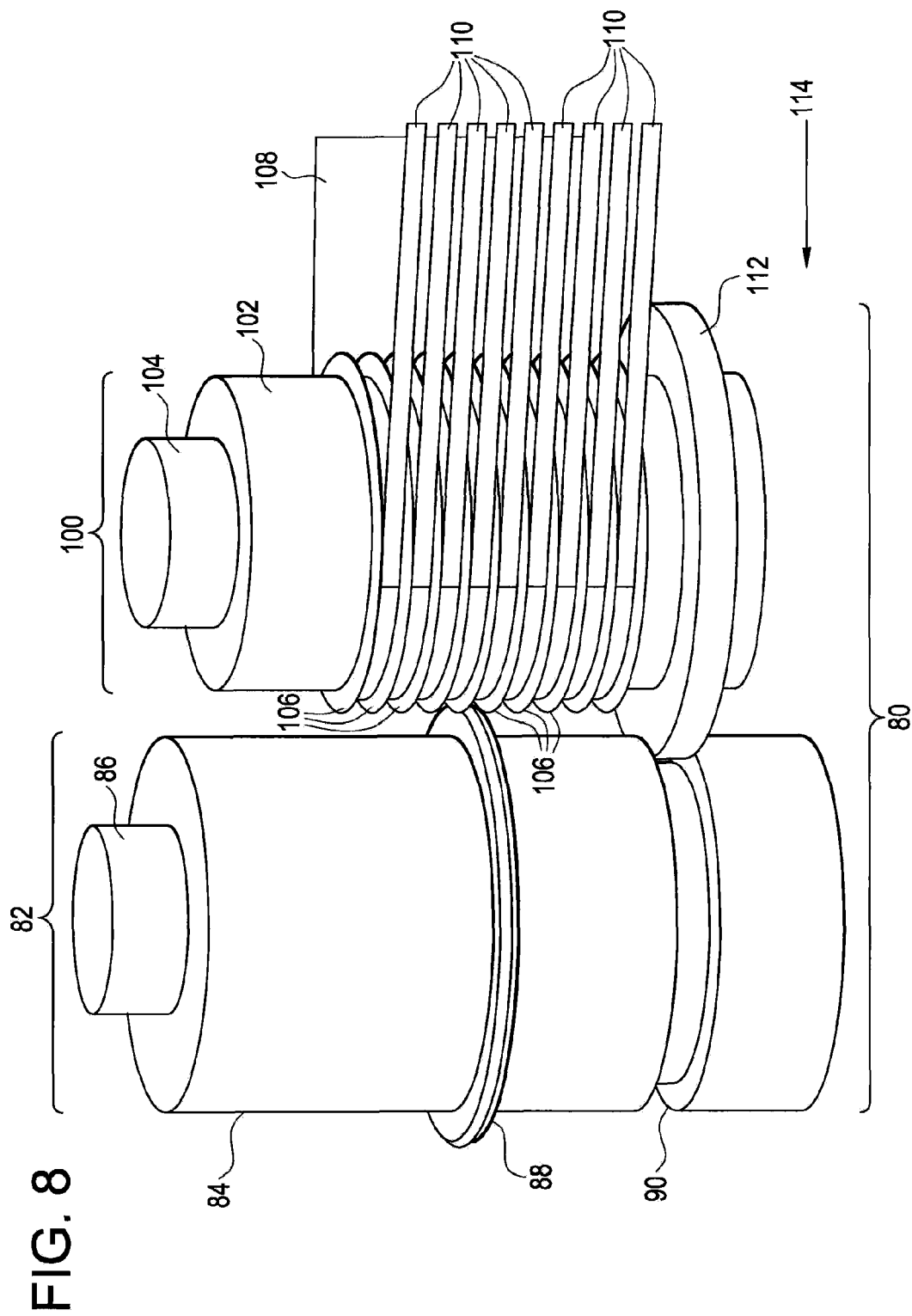
FIG. 8 is a bottom-side view of the assembly comprising a pinmat-following roller and a band-separating roller.

FIG. 8 depicts a bottom-side view of apparatus 80 showing nine strips 110 separated from band 108 by the band-separating roller 100. The strips are laid in adjacent parallel rows of the pinmat (not shown).

Band 108 has a width of 0.2 cm to 10 cm, and a thickness of at least 0.125 mm (5 mils), more particularly at least 0.125 to 0.5 mm (5 to 20 mil), and even more particularly 0.125 to 0.25 mm (5 to 10 mils). Separated strips 110 have a width of 1 mm to 8 mm, more particularly 3 mm to 8 mm, and a thickness of 0.125 to 0.5 mm.

Apparatus 80 can traverse a flat or contoured pinmat surface within the limitations of first circular rib 88. Further, apparatus 80 can produce a layer of a stacked structure in a single pass or in multiple passes. In a multiple pass scenario, alignment of the pinmat-following roller 82 with a subset of parallel rows can be accomplished by either displacing pinmat 10 relative to apparatus 80 or by displacing apparatus 80 relative to pinmat 10.

Figure 9:
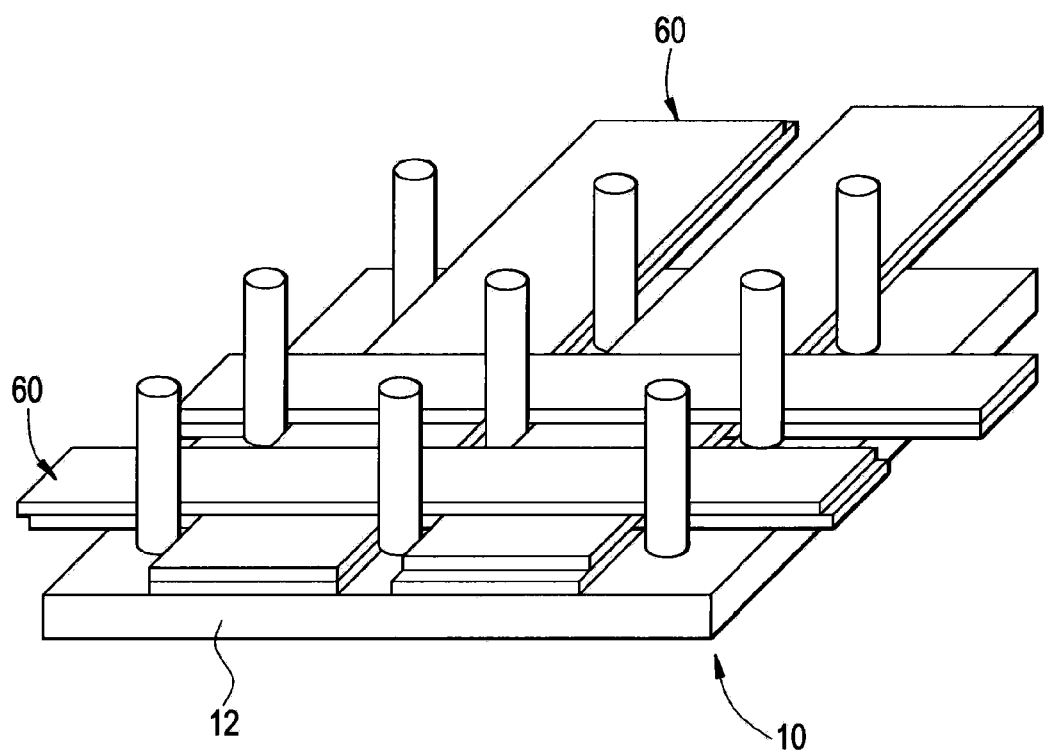
FIG. 9 is a side-view of a four-layer pre-cured stacked structure prepared using a pinmat having a square pin pattern like FIG. 2, showing strips in adjacent layers having different directional orientations.

The next step of the process comprises repeating at least one time the steps of selecting one of the directionally distinct sets of parallel pin rows, separating the band into strips, and disposing the strips to form a stacked structure comprising at least two layers of strips having different directional orientations. In one embodiment, repeating is for 2 to 20 times. Generally, the selected sets of pin rows have equal row spacing. FIG. 9 is a side view of a non-limiting example of a stacked structure 60 formed on a pinmat 10 utilizing a square pin pattern. In this example pin row sets having different directional orientation are selected alternatingly to produce a stacked structure wherein the strips in adjacent layers cross. Also contemplated are composite laminates constructed from sets of parallel pin rows having different row spacings.

No limitations are placed on the order in which the directionally distinct sets of parallel pin rows are selected or the number of times each set is selected providing the noise reduction properties and desired mechanical properties of the final composite laminate are not adversely affected. In one embodiment, each set of directionally distinct parallel pin rows having the same row spacing is selected at least once in the construction of the stacked structure. In one embodiment, adjacent layers have different directional orientations. The number of layers can vary from 2 to several hundred, more particularly from 5 to about 20, and even more particularly from 7 to 10.

The final step of the process comprises compressing and curing the stacked structure to effect adhesion of the at least two layers. The layers can be compressed by any means or methods known to those of skill in the art; for example, by applying a vacuum to the pinmat from the face opposite the pins, or by applying a compressive force from above the stacked structure of strips. In one embodiment, the subsequent application of a layer of strips at a different directional orientation compacts the previously laid strips. In another embodiment the strips are held under tension at the edges of the pinmat and with a downward force sufficient to compress the stacked structure. In another embodiment a pliable mat that can yield when pressed against the pins provides sufficient contact and force on the strips to compress the stacked structure.

The stacked structure can be cured thermally or by using irradiation techniques, including UV irradiation and electron beam irradiation. When heat curing is used, the temperature selected can be about 80° C. to about 200° C., and more particularly about 120° C. to about 240° C. The heating period may be about 1 minute to about 10 hours, though such heating period may advantageously be about 1 minute to about 6 hours, more particularly about 3 hours to about 5 hours. Such curing can be staged to produce a partially cured and often tack-free resin, which then is fully cured by heating for longer periods or temperatures within the aforementioned ranges.

The resulting composite laminate has the contour and through-hole pattern corresponding to the pinmat and comprises multiple layers of high-strength reinforcing fiber embedded within a resin matrix material. The composite laminate has about 10,000 to 100,000, more particularly 30,000 to 70,000 through-holes per square meter. The smallest circle encompassing the average through-hole of the composite laminate has a diameter of 0.5 to 1.5 mm. The composite laminate can have a glass transition temperature (Tg) of at least 100° C., more particularly 120° C., still more particularly at least about 140° C.

The cured laminate can exhibit a coefficient of thermal expansion (CTE) below its glass transition temperature of not greater than about 30 micrometer/meter-° C. (micrometer/m-° C.), preferably not greater than about 25 micrometer/m-° C., more specifically not greater than about 20 micrometer/m-° C.

The cured composition can have a fracture toughness measured according to ASTM D5045 of at least about 1.5 Mpa-$m^{0.5}$, specifically at least about 2.0 Mpa-$m^{0.5}$, more specifically at least about 2.5 Mpa-$m^{0.5}$, still more specifically at least about 3.0 Mpa-$m^{0.5}$, even more specifically at least about 3.5 Mpa-$m^{0.5}$.

Each layer of the composite laminate can comprise different compositions, forms and orientations of the reinforcing fiber. For example, the fibers can have a unidirectional orientation or may comprise a dual or triaxial fabric weave. Exemplary fibers include carbon/graphite, such as the graphite fiber sold by Celanese Corporation under the trademark CELION®, or aramid fibers, such as the aramid fiber sold by DuPont under the trademark KEVLAR®. Graphite fibers have the advantage that their coefficient of thermal expansion along their length is close to zero. Other reinforcing fibers comprise glass; for example, S-glass and E-glass fibers. Continuous fibers, particular continuous carbon fibers, provide for high strength composite laminates. However, semi-continuous or chopped fibers can also be employed. The fiber content of the composite laminate can differ substantially depending upon the use and desired mechanical properties of the laminate. In general, the fiber-resin blends comprise from about 50 wt % to about 70 wt % fiber per total weight of the blend, and more particularly about 60 wt %.

The selection of a unidirectional, bi-directional, other multi-directional fibers, and/or random mat fiber, can be made to impart a variety of desired physical characteristics to the composite laminate. For example, a unidirectional or bi-directional fiber predictably enhances the strength of the composite laminate in the directions of the fibers. A directional fiber also can provide increased stiffness in comparison to a random mat fiber. Alternatively, a random mat fiber typically provides greater resistance to deformation and crack propagation than does a directional fiber.

In one embodiment, the composite laminate comprises at least one layer comprising a directional fiber mat and at least one layer comprising a random fiber mat. The directional fiber mat includes a plurality of approximately parallel fibrous tow bundles. The random fiber mat, on the other hand, can be formed from a hybrid fibrous material, such as the quasi-isotropic material. The directional fiber layer imparts enhanced strength and stiffness in the direction of the fibers, whereas the random fiber layer imparts improved adhesion between layers, and increased impact resistance, and/or stress dissipation and reduced crack propagation. If desired, strips comprising a random fiber mat can be selectively applied to layers or pin rows within a directionally distinct set of pin rows of a layer where the properties of the random fiber mat are desired. Strips comprising directional fibers likewise can be applied to layers or pin rows within a directionally distinct set of pin rows of a layer only where necessary to achieve increased strength and/or stiffness, or to impart predetermined torsional characteristics to the composite laminate.

In particular, the fiber material comprises standard modulus carbon or glass.

The resin or matrix material can be a thermoplastic or thermosetting material. Conventional resinous materials include, for example, ABS-containing resinous materials (ABS/PC, ABS/polysulfone, ABS/PVC), acetals, acrylics, alkyds, allylic ethers, cellulosic esters, chlorinated polyalkylene ethers, cyanate/cyanamides, epoxies and modified epoxies, furans, melamine-formaldehydes, ureaformaldehydes, phenolic resins, poly(bis-maleimides), polyalkylene ethers, polyamides (nylons), polyarylene ethers, polybutadienes, polycarbonates, polyesters, polyfluorocarbons, polyimides, polyphenylenes, polyphenylene sulfides, polypropylenes, polystyrenes, polysulfones, polyurethanes, polyvinyl acetates, polyvinyl chlorides, polyvinyl chloride/vinylidine chlorides, polyetherimides, acetylene-terminated BPA resins, polyether ether imides, IPN polymers, triazine resins, and the like and mixtures thereof.

More particularly, the resin matrix is a thermoset resin, and even more particularly, an epoxy resin or blend of epoxy resins having an epoxide functionality of at least 2.0. Most epoxies used in composite fabrication are produced by the condensation reaction of epichlorohydrin and Bisphenol-A, but other epoxies may be used, such as the aliphatic and cycloaliphatic epoxy resins, the glycidated novolacs, and the tetraglycidyl ether of tetraphenylolethane. Any epoxy resin can be used as a thermosetting matrix resin, as long as the composite formed with the resin is thermally stable to at least about 90° C., and more specifically to at least about 170° C., and other properties such as noise dampening and mechanical strength are not adversely affected.

Exemplary epoxy resins include NARMCO® 5208, HERCULES® 3501, and FIBERITE® 934 epoxy compositions; EPON® 825 by Shell Chemical Company, Houston, Tex., epoxide equivalent weight 172 178, viscosity 4,000 6,000 centipoises @ 25° C.; DER® 332, epoxide equivalent weight 172 176, viscosity 4,000 6,000 centipoises @ 25° C.; ARALDITE® 6004, epoxide equivalent weight 179 minimum, viscosity 5,000 6,000 centipoises @ 25° C. Other useful, higher viscosity, bisphenol A-diglycidyl ether epoxy resins include EPON® 826, epoxide equivalent weight 178 186, viscosity 6,500 9,500 centipoises @ 25° C.; DER® 330, epoxide equivalent weight 177 188, viscosity 7,000 10,000 centipoises @ 25° C. and ARALDITE® 6005, epoxide equivalent weight 182 189, viscosity 7,000 10,000 centipoises @ 25° C.

Examples of higher viscosity resins include EPON® 828, epoxide equivalent weight 185 192, viscosity 11,000 15,000 centipoises @ 25° C.; DER® 331, epoxide equivalent weight 182 190, viscosity 11,000 14,000 centipoises @ 25° C. and ARALDITE® 6010, epoxide equivalent weight 182 196, viscosity 12,000 16,000 centipoises @ 25° C. Still higher viscosity bisphenol A-diglycidyl ether epoxy resins include EPON® 830, epoxide equivalent weight 190 198, viscosity 17,000 22,500 centipoises @ 25° C.; DER® 317 epoxide equivalent weight 192 203, viscosity 16,000 25,000 centipoises @ 25° C. and ARALDITE® 6020, epoxide equivalent weight 192 208, viscosity 16,000 20,000 centipoises @ 25° C.

Still other exemplary epoxy resins include bisphenol F-diglycidyl ether epoxy resins, for example EPON® DPL 862 having an epoxide functionality of 2.0, epoxide equivalent weight 166 177, and viscosity 3,000 4,000 centipoises @ 25° C.; ARALDITE® GY282, epoxide equivalent weight 167 175, viscosity 3,000 4,000 centipoises @ 25° C. and ARALDITE® GY285, epoxide equivalent weight 164 173, viscosity 2,000 3,000 centipoises @ 25° C. An epoxy novolac, such as DEN® 431 having a 2.2 epoxide functionality, epoxide equivalent weight 172 179 and viscosity 1,400 2,000 centipoises @ 52° C. can also be used, if desired.

Two or more epoxy resins can be blended to form the resin matrix for some applications. That is, the epoxy resins can be diluted with reactive diluents having an epoxide functionality of at least 1.0. Preferably, the epoxy resin or blend of epoxy resins remain a liquid at ambient temperatures for ease of application to the substrate.

The epoxy resin can also be blended with a high molecular weight linear polyether copolymer of bisphenol A and epichlorohydrin. Examples of acceptable linear polyether copolymers include EPONOL® 53 L 32, 32% solids in cellosolve acetate, Gardner Holdt viscosity Z Z5 at 25° C.; EPONOL® 55 L 32, 32% solids in cellosolve acetate, Gardner Holdt viscosity Z4 Z8 at 25° C.; EPONOL® 53 BH 35, 35% solids in methyl ethyl ketone/propylene glycol monomethyl ether 75:25, Gardner Holdt viscosity U Z2 at 25° C.; and EPONOL® 55 BH 30, 30% solids in methyl ethyl ketone/propylene glycol monomethyl ether 75:25, Gardner Holdt viscosity W Z at 25° C. Similar or equivalent linear polyether copolymers are available from other manufacturers.

Thermoplastic high glass transition temperature resins include for example, polyethylene terephthalate (PET polyester), polyethylene naphthalate (PEN polyester), polycarbonates, for example bisphenol A polycarbonate, polyimide films such as KAPTON®, polyphenylene sulfide (PPS), polyetherimide (PEI), polyethersulfone (PES) and polyetheretherketone (PEEK).

The epoxy resins are normally blended with an epoxy resin curing agent, at a weight ratio of from about 5:1 to about 5:6 total resin: curing agent, of which are well known in the art. A curing agent is used to enhance polymer growth, build molecular weight, and encourage three dimensional structures by the crosslinking of the epoxide resins used as starting materials. An exemplary curing agent is dicyandiamide, preferably micropulverized dicyandiamide where 98% is less than 10 microns and contains an anticaking agent.

Accelerator compounds useful with the epoxy-dicyandiamide include 3-phenyl-1,1-dimethylurea; 3-(4-chlorophenyl)-1,1-dimethylurea; 3-(3,4-dichlorophenyl)-1,1-dimethylurea; and 3-(3-chloro-4-methylphenyl)-1,1-dimethylurea. Other acceptable accelerators for use with the dicyandiamide include imidazoles, amines and complexes of amines or imidazoles with acidic compounds.

The fiber reinforced resin can further comprise a plasticizing compound in an amount between about 1 wt % and about 35 wt % by total weight of the resin (including the resin, curing agent, plasticizing agent, and other additives, but not the embedded fiber), and more particularly about 1 wt % to about 10 wt %, by total weight of the resin composition for controlling thermal properties of the resulting blend. Plasticizing agents are those polar agents with low molecular weight, i.e. MW of about 100 to 500, that tend to reduce the hardness or lower the Tg of the resin to which they are added. Plasticizers for a variety of resins, including epoxies, are known in the art. The plasticizing agent can be premixed with a resin or with the curing agent prior to impregnation of the fiber and curing of the resin.

Optionally, the fiber can be impregnated with a commercial resin having a low glass transition temperature (Tg). One such commercial resin is an epoxy sold as DURALCO® 4538N epoxy resin, available from Cotronics Corp, Brooklyn, N.Y. The DURALCO® epoxy is sold in kits which enable the mixing of the resin with different weight percentages of hardener, wherein the hardener contains a curing agent and a softening agent which acts to lower the Tg of the epoxy resin. The Tg of the DURALCO® epoxy is varied simply by varying the ratio of the hardener to resin before the resin is cured. When desirable, synthetic or natural rubber compounds added to the thermoset resin also can lower the Tg of the thermoset resin. The amount of rubber needed to lower the Tg to the desired level is easily determined by experimentation.

The above described method and apparatus produces composite laminates having excellent noise damping properties due to the large number of through-holes. Most advantageously, the through-holes are not formed by puncturing, drilling, or lasing. The composite laminates have excellent mechanical and thermal properties suitable for use in articles such as acoustic liners for jet engines, noise reduction panels for wind turbine structures, and other turbine devices.

The above written description enables any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. The singular forms "a," "an," and "the" include plural referents unless the context clearly dictates otherwise. The endpoints of all ranges directed to the same characteristic or component are independently combinable and inclusive of the recited endpoint. All amounts, parts, ratios and percentages used herein are by weight unless otherwise specified.

What is claimed is:

1. A method, comprising:
    introducing a band of fiber material impregnated with a resin to an apparatus comprising a band separating means and a pinmat, wherein the pinmat comprises a pin pattern having at least two directionally distinct sets of parallel rows of pins projecting from a surface, each one of the sets having a defined gap between each pair of adjacent rows;
    selecting one of the directionally distinct sets of parallel pin rows;
    separating the band to form a plurality of strips having a width less than or equal to the defined gap of a selected one of the sets;
    disposing the strips between the selected one of the sets of the parallel pin rows to form a layer of strips;
    repeating at least one time the steps of selecting one of the directionally distinct sets of parallel pin rows, separating the band, and disposing the strips to form a stacked structure comprising at least two layers of the strips, wherein the strips in adjacent layers have different directional orientations; and
    compressing and curing the stacked structure to effect adhesion of the at least two layers so as to form a composite laminate sheet comprising through-holes in a hole pattern corresponding to the pin pattern.

2. The method of claim 1, wherein separating and disposing are performed simultaneously.

3. The method of claim 1, wherein repeating is for 2 to 20 times.

4. The method of claim 1, wherein curing comprises heating the compressed stacked structure at about 80° C. to about 200° C. for 1 minute to 10 hours.

5. The method of claim 1, wherein separating the band produces a strip having a thickness different from the thickness of the initial band.

6. The method of claim 1, wherein compressing is by means of a vacuum.

* * * * *